United States Patent [19]
Lim

[11] Patent Number: 5,422,675
[45] Date of Patent: Jun. 6, 1995

[54] ADAPTIVE MODULATION/DEMODULATION SIGNAL PROCESSING

[75] Inventor: Jae S. Lim, Winchester, Mass.

[73] Assignee: Massachusetts Institute of Technology, Cambridge, Mass.

[21] Appl. No.: 542,178

[22] Filed: Jun. 22, 1990

Related U.S. Application Data

[63] Continuation-in-part of Ser. No. 471,532, Jan. 29, 1990.

[51] Int. Cl.$^6$ .................... H04N 7/12; H04N 11/02
[52] U.S. Cl. .................... 348/420; 348/421; 348/406
[58] Field of Search ........... 388/133, 135, 136, 141, 388/142, 426, 261.1, 261.2, 261.3, 427; 382/50, 56; 375/122; 358/12, 30, 37, 166, 167, 160, 21 R; 315/27; 348/420, 421, 400, 404, 405, 406; H04M 7/12, 11/02, 11/04

[56] References Cited

U.S. PATENT DOCUMENTS

| | | | |
|---|---|---|---|
| 4,698,689 | 10/1987 | Tzou | 358/133 |
| 4,707,738 | 11/1987 | Ferre et al. | 358/133 |
| 4,780,761 | 10/1988 | Daly et al. | 358/138 |
| 4,797,742 | 1/1989 | Sugiyama et al. | 358/135 |
| 4,821,119 | 4/1989 | Gharavi | 358/133 |
| 4,941,043 | 7/1990 | Jass | 358/133 |
| 4,985,784 | 1/1991 | Tsuboi et al. | 358/136 |
| 5,001,561 | 3/1991 | Haskell et al. | 358/133 |

OTHER PUBLICATIONS

International Search Report for corresponding PCT Application No. PCT/US91/00608.
Cassereau et al., "Encoding Images Based on a Lapped Orthogonal Transform," IEEE Transactions on Communications, vol. 37, No. 2, pp. 189-193 (Feb. 1989).
Woods, "Subband Coding of Images," IEEE Transactions on Acoustics, Speech, and Signal Processing, vol. ASSP-34, No. 5, pp. 1278-1288 (Oct. 1986).
Ahmed et al., "Discrete Cosine Transform," IEEE Transactions on Computers, pp. 90-95 (Jan. 1974).
Wintz, "Transform Picture Coding," Proceedings of the IEEE, vol. 60, No. 7, pp. 809-820 (Jul. 1972).
Netravali et al., "Picture Coding: A Review," Proceedings of the IEEE, vol. 68, No. 3, pp. 366-406 (Mar. 1984).
Lim, "Two-Dimensional Signal and Image Processing," Prentice-Hall (1990).
Schreiber, William F., "Improved Television Systems: NTSC and Beyond," SMPTE Journal, vol. 66, No. 8 (Aug. 1987).
Schreiber, William F., "Psychophysics and the Improvement of Television Image Quality," SMPTE Journal, vol. 93, No. 8 (Aug. 1984).
Schreiber et al., "Reliable EDTV/HDTV Transmission in Low-Quality Analog Channels," SMPTE Journal, pp. 496-503 (Jul. 1989).

*Primary Examiner*—James J. Groody
*Assistant Examiner*—Michael H. Lee
*Attorney, Agent, or Firm*—Fish & Richardson

[57] ABSTRACT

Method and apparatus for channel noise reduction. This method uses adaptive modulation/demodulation for noise reduction. The modulation factor does not require a large amount of data to be represented. Representation is based upon a frequency-domain function having a particular characteristic. A preferred embodiment of the invention incorporates transform or subband-filtered signals which are transmitted as a modulated analog representation of a local region of a video signal. The modulation factor reflects the particular characteristic. Side information specifies the modulation factor.

67 Claims, 12 Drawing Sheets (a)

(b)

(c)

$N_2$ $N_1$ $X_{ij}(k_1, k_2)$

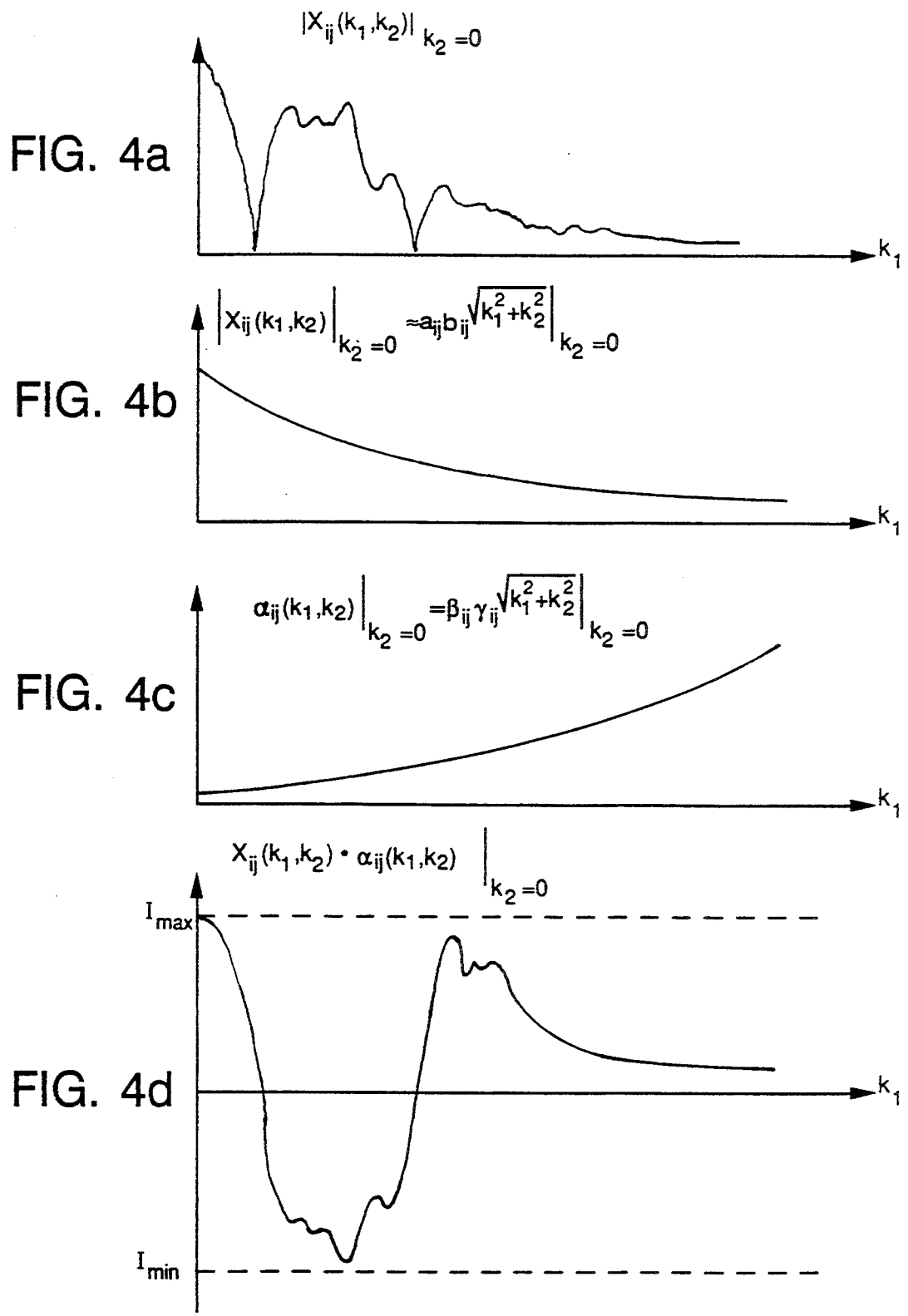

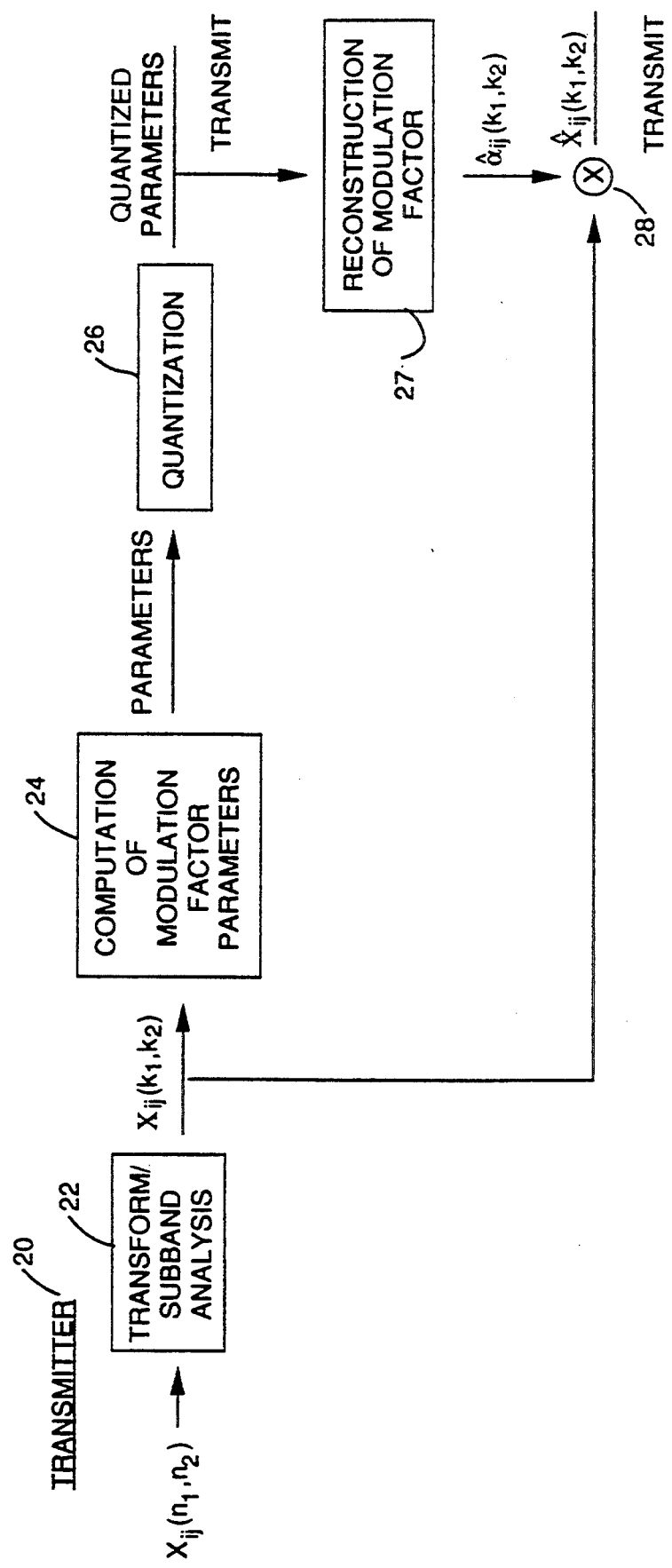

ADAPTIVE MODULATION/DEMODULATION SIGNAL PROCESSING

BACKGROUND OF THE INVENTION

This application is a continuation in part of U.S. Ser. No. 07/471,532, filed Jan. 29, 1990.

The present invention relates to adaptive modulation/demodulation apparatus and techniques.

In the transmission of analog video signals, such as by radio, cable, satellite, fiber-optics, or wire, the received signal may suffer loss of quality due to random noise, interference from other signals, echoes due to multipath transmission, and frequency distortion. As a result, in the case of broadcast television, for example, the image quality on typical home receivers may be substantially degraded compared to the studio signal.

SUMMARY OF THE INVENTION

Various adaptive modulation/demodulation (AM/DM) techniques have been employed to enhance transmission/reception of information signals. The AM/DM method has been demonstrated to be quite effective in combatting channel degradation as applied to video signals. The method, however, requires that the adaptive modulation factor be sent as side information, and it is therefore important to reduce the amount of this side information so as to restrict bandwidth. In addition, experience has shown that the adaptive modulation factor should be highly localized spatially for the method to be effective.

The present invention provides spatial localization for an adaptive modulation factor. In addition, it does not require a large amount of data to represent the modulation factor. A preferred embodiment of the invention incorporates transform coefficients or subband-filtered signals which are transmitted as an analog representation of a local region of a video signal. Quantization and digital transmission is also possible.

In one aspect of the invention, a method is provided for transmitting an information signal in a modified form, including the steps of (a) analyzing the information signal before it is modified to obtain a frequency-domain function signal representative of the information signal, (b) deriving a set of parameter signals from the frequency domain function signal, (c) modifying the frequency-domain function signal consistent with the set of parameter signals, and (d) transmitting the modified frequency-domain function signal and the set of parameter signals to a receiving location, such that the transmitted modified frequency-domain function signal may be processed according to the transmitted set of parameter signals to recover an approximation of the information signal.

The foregoing aspect may include any of the following features. The information signal may represent a local region of a source signal and the frequency-domain function signal may have a predictable feature which is characteristic of the frequency-domain function signal for that local region, The predictable feature may be some function that can be represented with few parameters. The predictable feature may be fast decay, The predictable feature may be expressible as an exponential function, The frequency-domain function signal may be processed to obtain an approximation function signal which is related approximately to an approximation of the frequency-domain function signal. Step (b) may include processing the frequency-domain function signal to provide an approximation function signal having the predictable feature, Step (b) may include processing the approximation function to provide a set of parameter signals, The set of parameter signals may be obtained from inverting the approximation function. A modification factor signal may be obtained by approximately inverting the approximation function. The set of parameter signals may be obtained from the modification factor signal. The modification factor signal may be reconstructed based upon the set of parameter signals, The frequency-domain function signal may be modified with the reconstructed modification factor signal. Analyzing the information signal may include transform-type or subband-type analysis. Either or both the modified frequency-domain function signal and the set of parameter signals may be quantized before transmission.

In another aspect of the invention, a method for approximating an information signal (wherein the information signal is represented by a representative signal which has been modified with a modification factor signal consistent with a set of parameter signals) includes the steps of (a) obtaining the representative signal and the set of parameter signals such that the representative frequency-domain function signal and the set of parameter signals are related, (b) reconstructing the modification factor signal based on the set of parameter signals and generating a demodification factor signal based on the reconstructed modification factor signal, and (c) applying the demodification factor signal to the modified representative signal to recover an unmodified approximation of the information signal.

Embodiments of the foregoing aspect may include the following features. Step (b) may include inverting the reconstructed modification factor signal. Step (c) may include demodifying the modified representative signal with the inverted reconstructed modification factor signal. The information signal may take the form of a local region signal of a source signal and step (c) may further comprise the step of synthesizing an approximation of the local region signal from the demodified representative signal. The representative signal may be fast decaying. The synthesis may include transform-type or subband-type synthesis.

In another aspect of the invention, a method for approximating a function derived from a signal of interest includes (a) processing the signal of interest with transform or subband-type analysis to obtain a frequency-domain function such that the function has a predictable feature characteristic of the function, and (b) approximating the function with an approximation function having the predictable feature, the approximation function represented by a set of parameters such that an approximation of the frequency-domain function can be created by application of the set of parameters to the approximation function.

Embodiments of the foregoing aspect may include any of the following features. The approximation function may be an exponential function. The aspect may further include the step of applying the signal of interest to transform coding and using the approximation function for bit allocation during such coding. In transform coding, the signal is transformed into a transform domain and the transform coefficients are quantized. The approximation function can be used in bit allocation by allocating more bits to transform coefficients corresponding to a larger-amplitude approximation function. The aspect may further include the step of using the approximation function for obtaining a modulation factor for AM/DM.

A further aspect of the invention may include a system for adaptively modulating a signal, including
  (a) a circuit for coding a signal into a frequency-domain function signal having a predictable characteristic,
  (b) a circuit for generating a modulation function signal having the predictable characteristic based upon an approximation of the frequency-domain function signal, and
  (c) a circuit for modulating the frequency-domain function signal with the modulation function signal.

Another aspect of the invention may include a system for demodulating a captured signal which in premodulated form has been modulated with a modulation function signal, the modulation function signal being expressible with a set of parameter signals, comprising
  (a) a circuit for generating a demodulation function signal based upon the set of parameter signals,
  (b) applying the demodulation function signal to the captured signal to generate a demodulated signal, and
  (c) applying the demodulated signal to a synthesis function compatible with frequency domain functional analysis, whereby an approximation of the pre-modulated form of the captured signal may be generated.

In another aspect of the invention, an information signal is encoded by:
  (1) forming a frequency-domain representation of the information signal;
  (2) fitting a predetermined adaptive modulation function to the frequency domain representation, by selecting values for the parameters defining the modulation function; and
  (3) adaptively modulating the frequency-domain representation using the modulation function.

In another aspect of the invention, a television signal is encoded by:
  (1) dividing the frames into a plurality of spatially-localized blocks, each block containing a plurality of pixels;
  (2) forming a frequency-domain representation of each block, the representation having at least two spatial dimensions;
  (3) fitting a predetermined adaptive modulation function to each frequency domain representation, by selecting values for the parameters defining the modulation function, the modulation function having at least two spatial dimensions; and
  (4) adaptively modulating each frequency-domain representation using its modulation function.

In preferred embodiments, the modulation function includes discontinuous regions and the selected values define the shape of the modulation function within those regions. The modulation function has a constant amplitude within at least some of the regions, and the selected values include the amplitudes within those regions. The frequency-domain representation has at least two spatial frequency dimensions, and the modulation function has four regions: a first region smaller than the others and located adjacent the origin in frequency space, a second region extending from the origin along one of the spatial frequency axes, and containing low spatial frequencies in one dimension, a third narrow, elongated region extending from the origin along the other of the spatial frequency axes, and containing low spatial frequencies in the other dimension, and a fourth region containing the high spatial frequencies. The second and third regions are each divided along their long dimensions into two regions. The fourth region is divided into middle and highest frequency regions. The regions include at least some regions in which the modulation function is a continuous function definable by a set of parameters, and the selected values include the values of those parameters. Alternatively, the modulation function can be one continuous function definable by the selected values. The continuous function is an exponential function. The continuous function can be a polynomial function, and may decay in amplitude at higher frequencies. The same modulation function is used for a plurality of neighboring blocks within zones within the frame. The size of the zones is chosen adaptively.

In another aspect the invention features a method of encoding a television signal by:
  (1) dividing the frames into a plurality of spatially-localized blocks, each block containing a plurality of pixels;
  (2) forming a frequency-domain representation of each the block, the representation having at least two spatial dimensions and comprising a plurality of coefficients, each coefficient representing the value of the frequency-domain representation at a particular frequency for that block; and
  (3) normalizing the frequency-domain representation across a plurality of blocks prior to adaptive modulation, wherein the normalization is done on an coefficient by coefficient basis by scaling the amplitude of corresponding coefficients in all of the plurality of blocks by the same scale factor.

In preferred embodiments, the frequency-domain representation of each block has a plurality of coefficients, each coefficient representing the value of the frequency-domain representation at a particular frequency for that block, the frequency-domain representation is normalized across a plurality of blocks prior to adaptive modulation, and the normalization is done on an coefficient by coefficient basis by scaling the amplitude of corresponding coefficients in all of the plurality of blocks by the same scale factor. The scale factors are predetermined for given coefficient locations, and remain the same from frame to frame. The scale factors are chosen adaptively and vary from frame to frame. Scale factors are chosen by: (1) determining the range of variation of that coefficient over a plurality of blocks (e.g., determining the maximum and minimum of the coefficient over those blocks); and (2) based on the range of variation, determining a scale factor that will raise the amplitude of the coefficient with the highest amplitude without exceeding a permissible amplitude range. The normalization is done over at least one full frame, by determining the range of variation of individual coefficients over at least a full frame. At least some of the coefficients have positive and negative amplitudes.

The adaptive modulation/demodulation method according to the invention is effective in combating channel degradation. The method preferably uses the adaptive modulation factor as side information, and it is desirable to reduce the amount of this side information. In addition, the adaptive modulation factor is preferably highly localized spatially.

The invention may be better understood from the following brief discussion. Let $X_{ij}(k_1,k_2)$ denote the transform coefficients of a small subimage ((i,j)the block) of size M×M. A typical size in transform coding is 4×4, 8×8, 16×16, or 32×32. Since the adaptive modulation method preferably uses high spatial localization, the size of 8×8 is preferable to 16×16 or 32×32. Within the given block, the modulation factor $\alpha_{ij}(k_1,k_2)$ is represented by a few (including one or two) parameters exploiting the characteristics of $X_{ij}(k_1,k_2)$. It is known that $|X_{ij}(k_1,k_2)|$ generally decreases rapidly as $k_1$ and $k_2$ increase. Therefore, $\alpha_{ij}(k_1,k_2)$ may be chosen to be of the form of $\alpha_{ij}(k_1,k_2)=\beta_{ij}\cdot\gamma_{ij}\sqrt{k^2_1+k^2_2}$. Other known functions of this type can also be used. The parameters $\beta_{ij}$ and $\gamma_{ij}$ are preferably chosen so that $X_{ij}(k_1,k_2)\cdot\alpha_{ij}(k_1,k_2)$ lies within a specified range for any of the coefficients that are actually selected. $\alpha_{ij}(k_1,k_2)$ is typically different for different values of (i,j).

The transform coefficients $X_{ij}(k_1,k_2)$ can be obtained in a variety of different ways. For example, $X_{ij}(k_1,k_2)$ can be discrete cosine transform (DCT) coefficients or discrete Fourier transform (DFT) coefficients. Alternatively, $X_{ij}(k_1,k_2)$ can be obtained from subband filtered signals. Specifically, let $s_{lm}(n_1,n_2)$ represent the subband-filtered signal corresponding to the (l,m)th band. Then $X_{ij}(k_1,k_2)$ can be obtained from $s_{lm}(n_1,n_2)$ by $$X_{ij}(k_1,k_2) = s_{lm}(n_1,n_2)$$
$$| n_1 = i, n_2 = j, l = k_1, m = k_2.$$

As long as $X_{ij}(k_1,k_2)$ has some predictable feature, this feature may be used in choosing the modulation factor.

The invention allows spatial localization for the modulation factor $\alpha_{ij}(k_1,k_2)$. In addition it does not require a large amount of data to represent $\alpha_{ij}(k_1,k_2)$. Specifically, suppose the block size is 4×4, only two parameters may represent $\alpha_{ij}(k_1,k_2)$, and each parameter may be represented with only three bits. Then the required bit rate for $\alpha_{ij}(k_1,k_2)$ would be (⅜) bit/sample. If the block size is 8×8, only two parameters may represent $\alpha_{ij}(k_1,k_2)$ and each parameter again may be represented with only three bits, the required bit rate then being (3/32) bit/sample. The invention is especially practical in applications where transform coefficients or subband-filtered signals are transmitted with analog representation.

Even though the 2-D case was considered above, the invention is applicable to the 1-D, 3-D or higher dimensional case.

Other advantages and features will become apparent from the following detailed description when read in connection with the accompanying drawings and from the claims.

FIG. 4 shows signals generated in practice of the invention.

FIG. 5 is a block diagram of a transmitter in practice of the invention.

Figure 6:
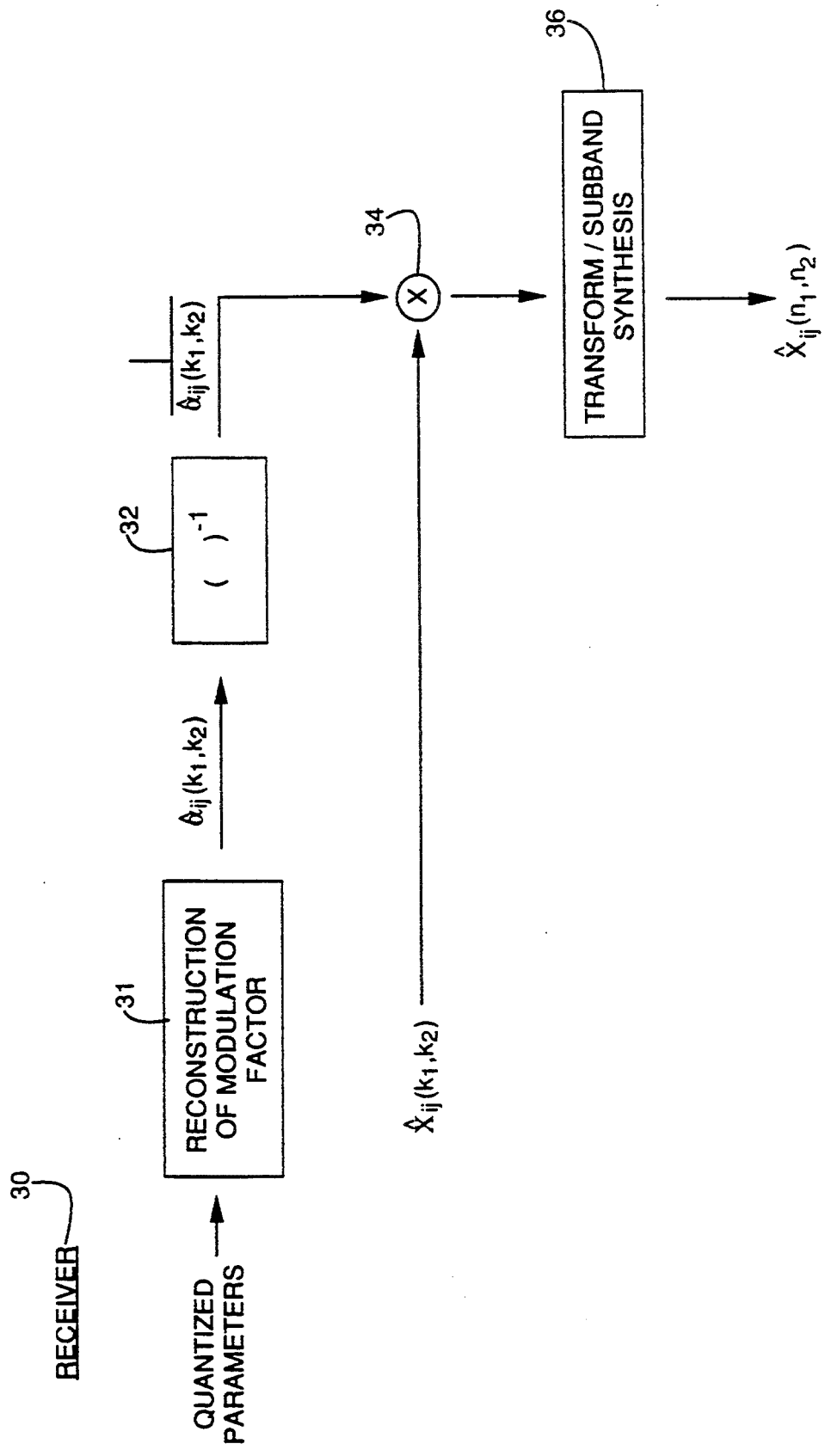
FIG. 6 is a block diagram of a receiver in practice of the invention.
Figure 7A:
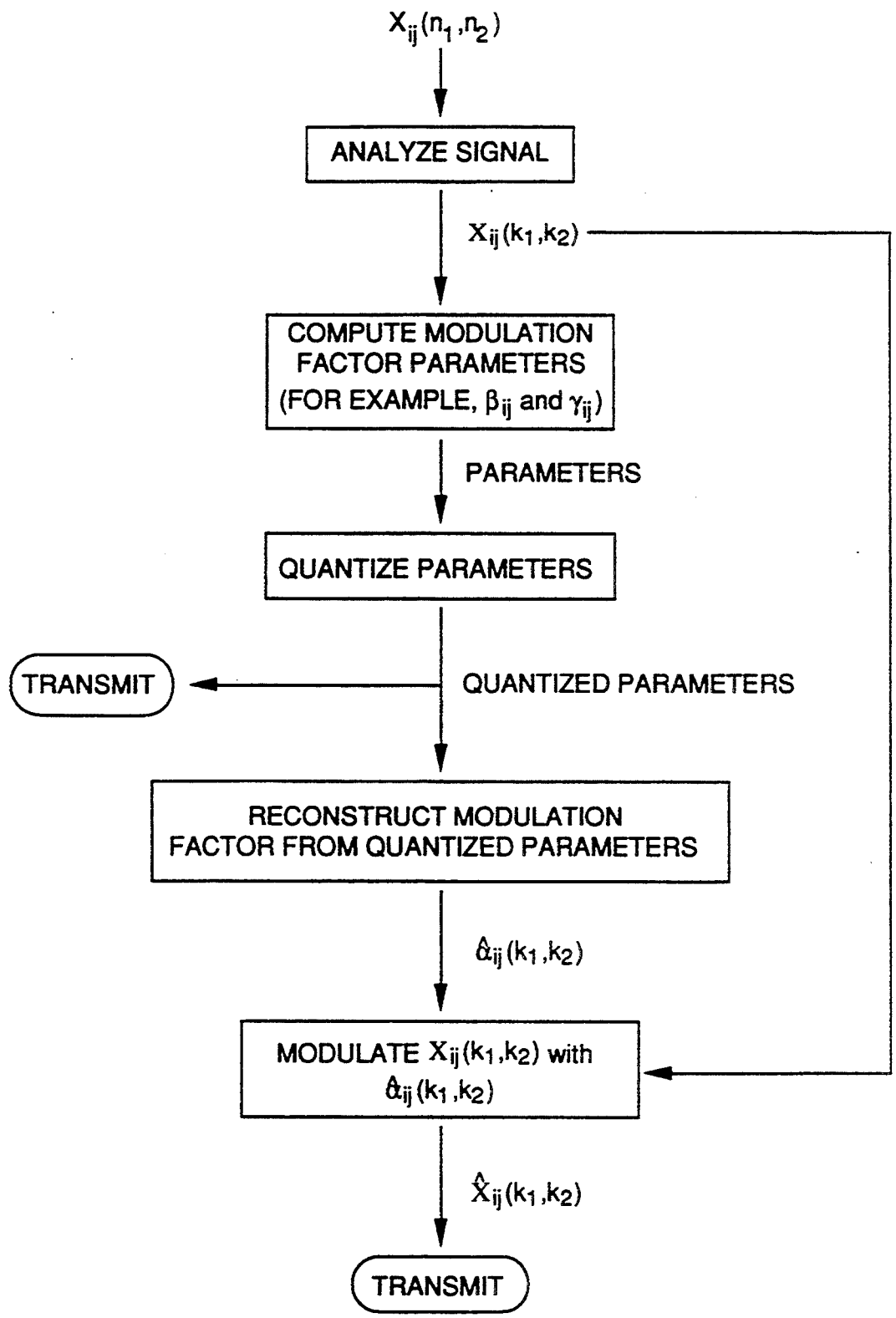
Figure 7B:
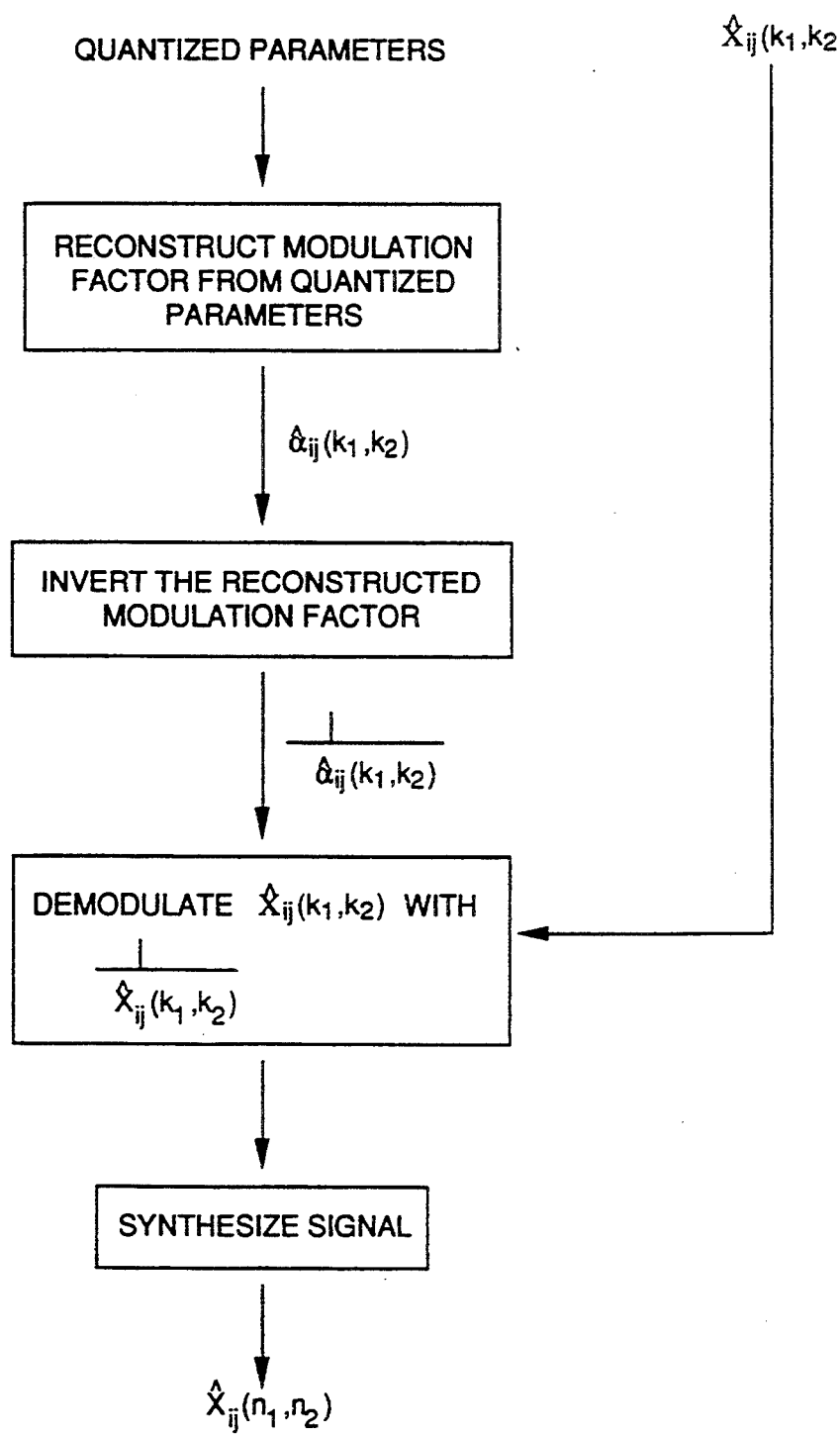

FIG. 7(a) and 7(b) are flow chart of the operation of the transmitter/receiver of FIGS. 5, 6.

Figure 8:
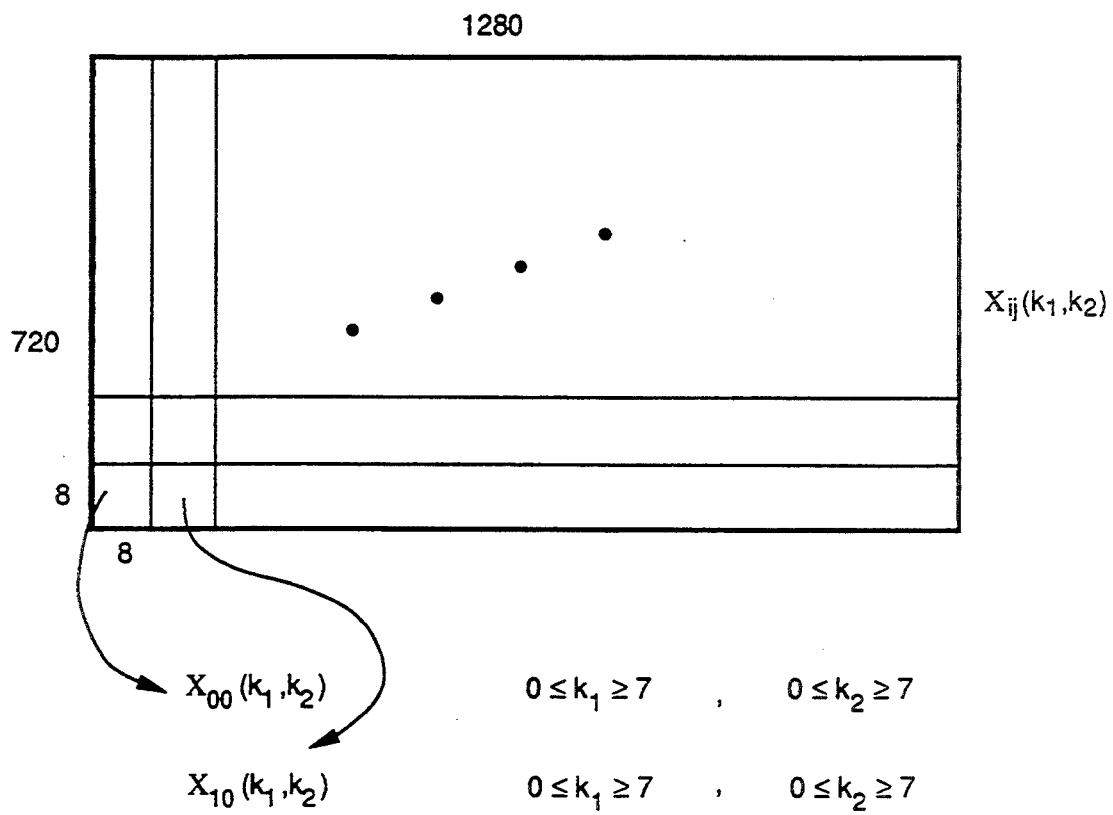

FIG. 8 shows a frequency domain representation of a single frame.

Figure 9:
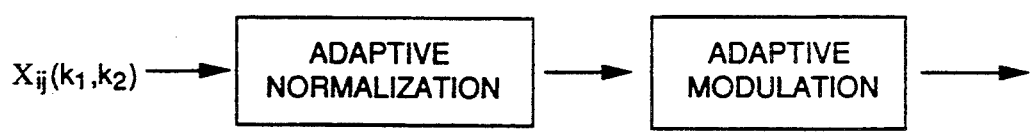

FIG. 9 shows the use of adaptive normalization in advance of adaptive modulation.

Figure 10:
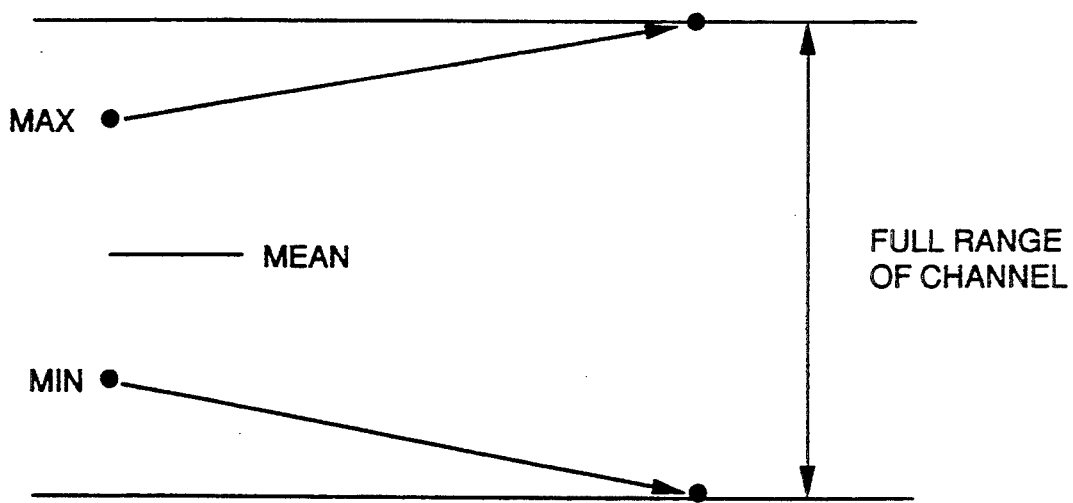

FIG. 10 shows the minimum and maximum values are expanded to fill the full range of the communication channel.

Figure 11A:
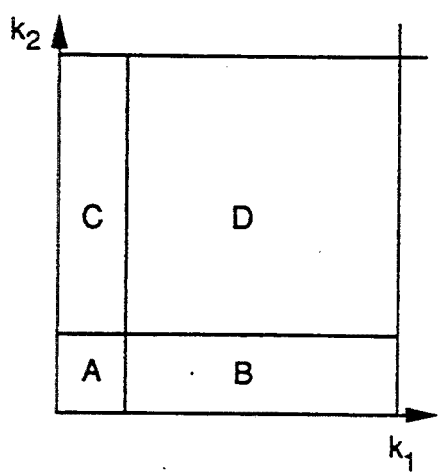
Figure 11B:
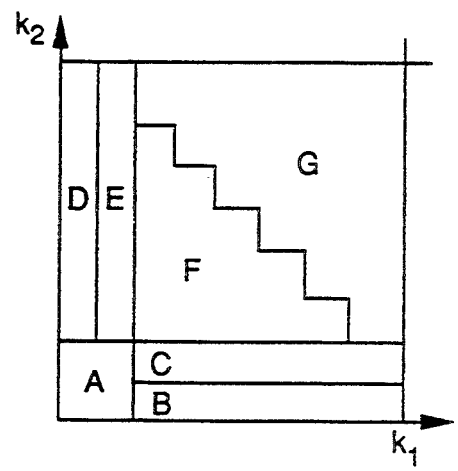

FIGS. 11a and 11b shows preferred region layouts.

Figure 12:
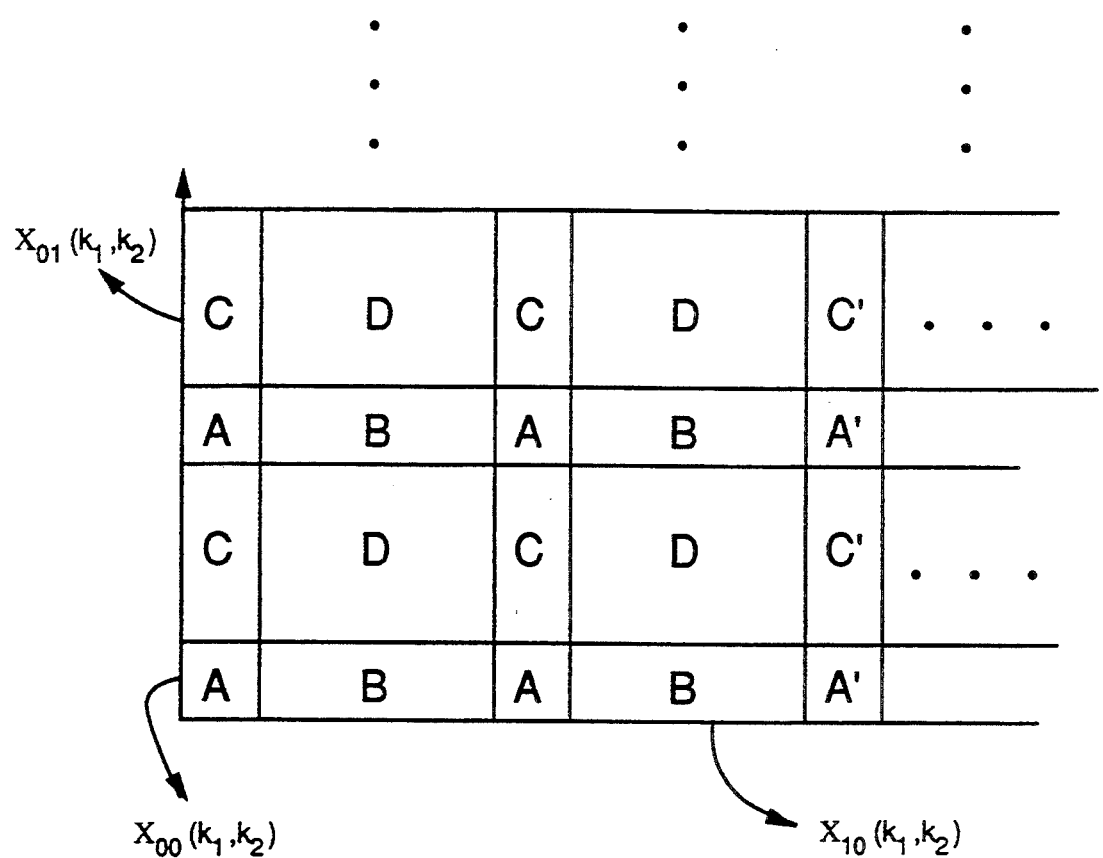

FIG. 12 shows the same modulation factors in the limited number of neighborhood.

One AM/DM technique involves multiplying the video signal by modulation factors before transmission and dividing the received video signal by the same factors, the modulation factors being transmitted to the receiving location according to an agreed-upon format and timing sequence along with the modified transmission signal. Of course, transmitting modulation factors for each signal sample requires considerable bandwidth, and the desire is therefore to reduce the number of modulation factors that need to be transmitted so as to limit the required bandwidth.

Figure 1A:
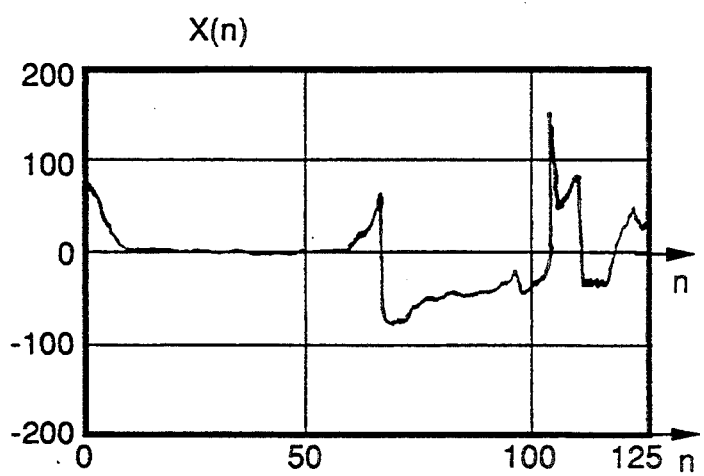
FIG. 1 shows prior art video signals. These signals vary within a range of ±200 arbitrary intensity units over a set of spatial coordinates from 0 to 125, coordinating pixel locations 0–125.
Figure 1B:
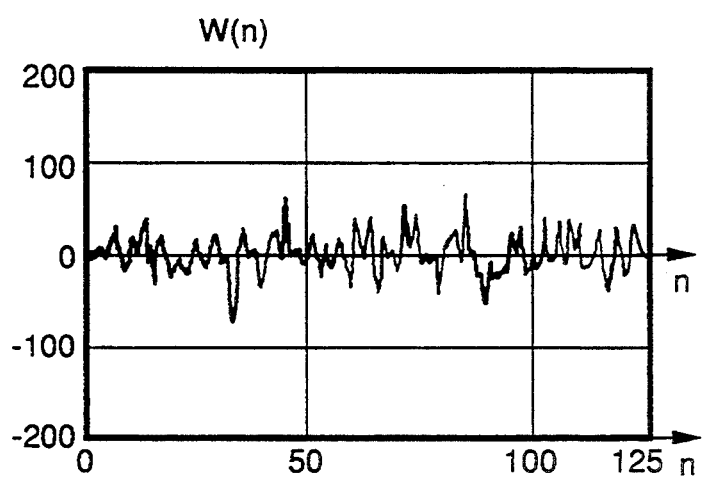
Figure 1C:
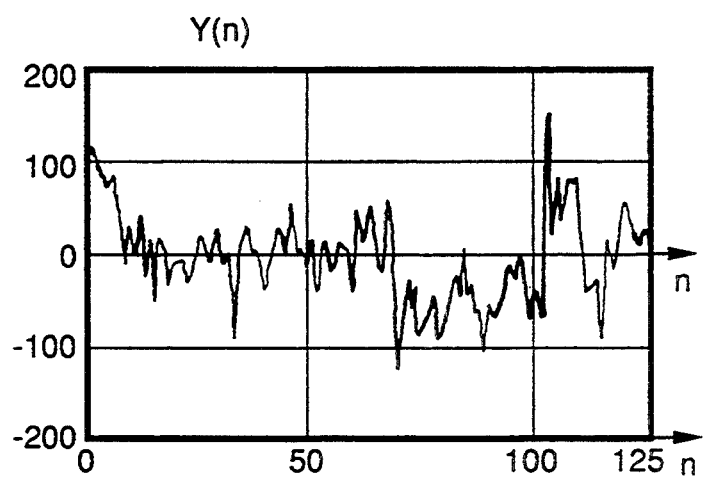

An example of a prior art video transmission signal, x(n), is shown in FIG. 1(a). In this example, the DC value has been removed from the signal. An example of channel noise, w(n), is shown in FIG. 1(b). The received degraded signal, y(n), is shown in FIG. 1(c).

Figure 2B:
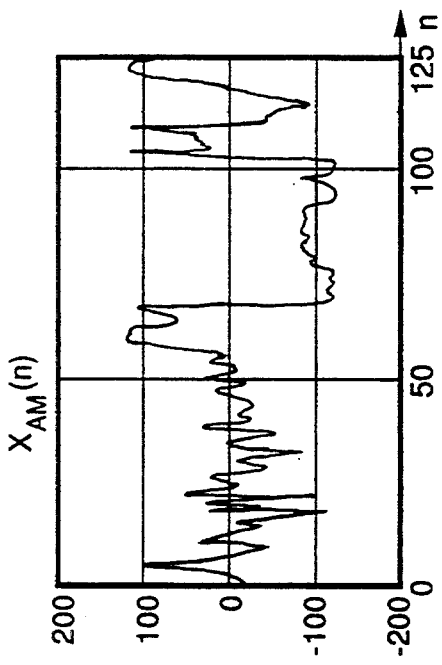
FIG. 2 shows signals in practice of AM/DM. These signals vary within a range of ±200 arbitrary intensity units over a set of spatial coordinates from 0 to 125, coordinating pixel locations 0–125.
Figure 2D:
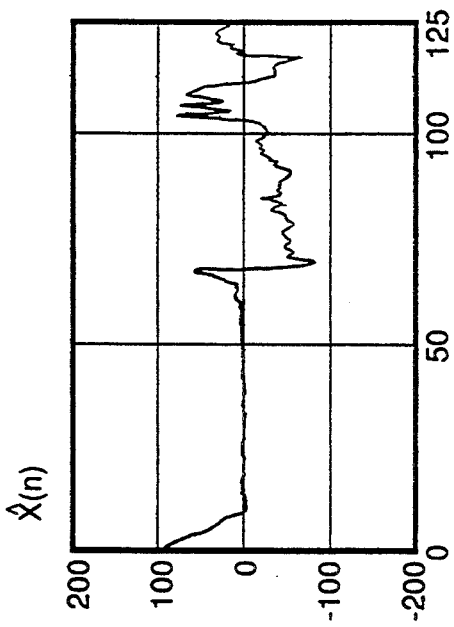
Figure 2A:
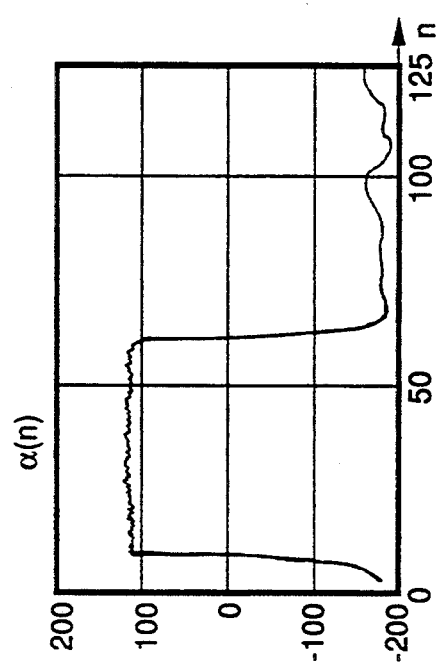
Figure 2C:
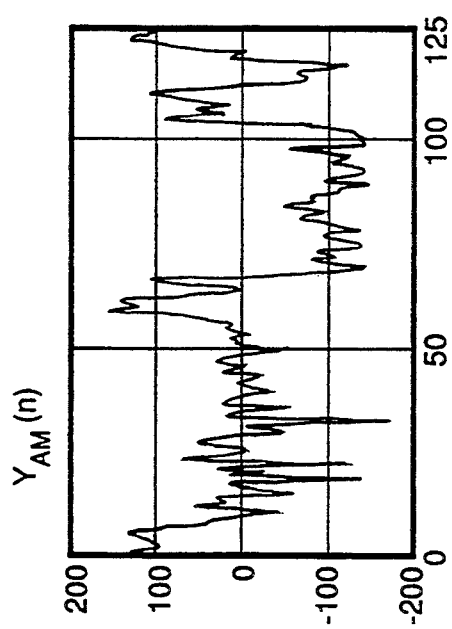

In AM/DM, the signal x(n) of FIG. 1(a) is multiplied prior to transmission by a modulation factor $\alpha(n)$ as shown in FIG. 2(a), in order to obtain a transmitted adaptively modulated signal $x_{AM}(n)$ shown in FIG. 2(b). Now with the noise w(n) of FIG. 1(b) added to the transmitted signal, the received signal $y_{AM}(n)$ appears as in FIG. 2(c). However, if the modulation factor $\alpha(n)$ has been transmitted via additional side information, the signal shown in FIG. 2(c) may be demodulated according to the modulation factor to obtain, as seen in FIG. 2(d), signal $\hat{x}(n)$, as an estimate of the original video signal x(n). The signal of FIG. 2(d) compares favorably with that of FIG. 1(c).

The above example of AM/DM, uses 1-D (one-dimensional) signal notations, such as x(n), w(n), y(n), $\hat{x}(n)$, $\alpha(n)$, $x_{AM}(n)$ and $y_{AM}(n)$. AM/DM may also be used with higher-dimensional signals such as 2-D (two-dimensional) and 3-D (three-dimensional) signals. For 2-D signals, the corresponding signal notations may be $x(n_1,n_2)$, $w(n_1,n_2)$, $y(n_1,n_2)$, $\hat{x}(n_1,n_2)$, $\alpha(n_1,n_2)$, $x_{AM}(n_1,n_2)$ and $y_{AM}(n_1,n_2)$. In the following discussion, the 2-D signal notations will often be used. It is to be understood that the invention is not limited to 2-D signals.

For applications such as advanced television (ATV) system design, the signal $x(n_1,n_2)$ may represent a video luminance or a bandpass-filtered and frequency-shifted luminance as a function of two spatial coordinates $(n_1,n_2)$. It is convenient to assume that $x(n_1,n_2)$ is an $N_1 \times N_2$-point sequence. For example, where $x(n_1,n_2)$ represents the video luminance of one video frame in a ATV system, one choice of $N_1 \times N_2$ (where $N_1$ and $N_2$ are the number of pixels in a row and column, respectively) is 720 by 1280 pixels.

According to the present invention, the modulation factor is selected based upon a local frequency-domain characteristic of the video signal (typically decay). This reduces the number of parameters required to specify the modulation factor (and thus reduces the bandwidth) for transmission. In the case of video signals in ATV applications, few parameters therefore need be transmitted as side information in order to accurately communicate the modulation factor.

The modulation factor preferably is obtained by applying a sub-band or transform-type signal analysis to a local region of the original video signal and approximating the analyzer output (a frequency-domain function) with a typically decaying function. The video signal is modulated with the approximate inverse of this function. Side information is transmitted to specify the parameters of the modulation function. Few parameters are required to be transmitted. The received signal may therefore be demodulated using the same approximately inverted, decaying approximation function according to the received side information.

More particularly, the frequency-domain function generated by the signal analysis both represents the original signal and also has a particularly useful characteristic. This characteristic may typically approximate a decaying signal, such as expressed with an exponential function. By selecting a function such as an exponential function (which can be expressed with just a few parameters) as the approximating function, then just a few parameters will completely specify the modulation factor. As a result, just a few side information parameters need be transmitted for each local region in order to represent the modulation factor for that region.

Before applying the signal analysis, the present invention resolves the video signal into a set of encoded local regions. The size of a local region in an ATV system is typically $4 \times 4 \sim 32 \times 32$.

Figure 3A:
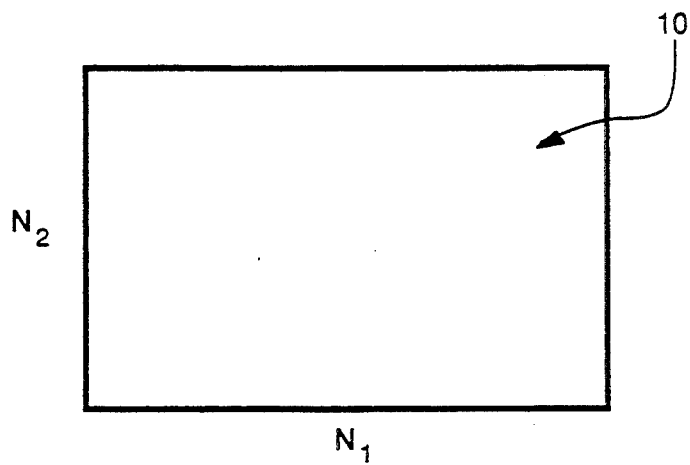
FIG. 3 shows spatial features of a video signal.
Figure 3B:
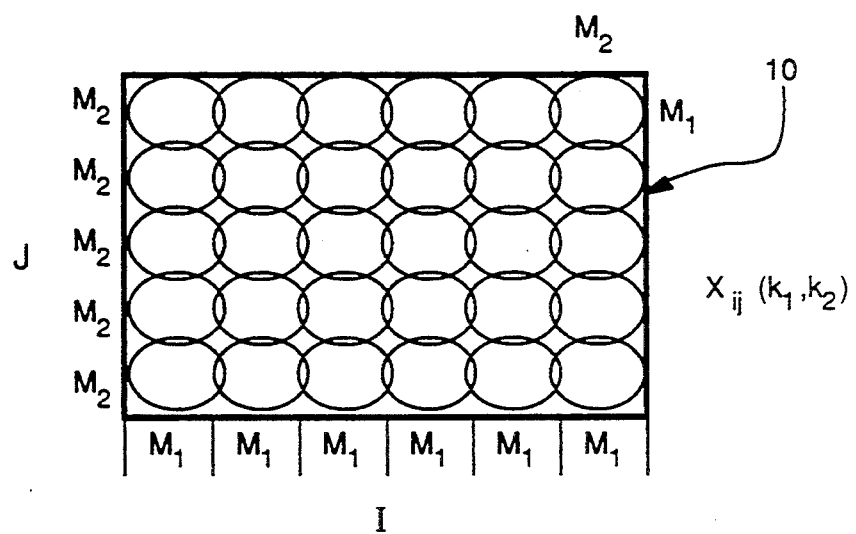

The local regions will now be described in greater detail with reference to FIG. 3. In FIG. 3a, an image 10 is shown as an $N_1 \times N_2$-point sequence. While the total number of points in the signal is expressed as $N_1 \times N_2$, the signal may be reduced to a series of local regions, with a total of $I \times J$ local regions, shown in FIG. 3b. Generally, the same number of points $M_1 \times M_2$ is used to represent each local region and the total number of points $N_1 \times N_2$ can typically be expressed as $I \times J \times M_1 \times M_2$, so that the total number of points in video signal $x(n_1, n_2)$ of FIG. 3a is the same as the total number of points used in representing the local regions of FIG. 3b.

After the signal analysis, each local region is expressed as a frequency-domain function $X_{ij}(k_1, k_2)$, where $k_1$ and $k_2$ are frequency-domain variables that can be related to such units as cycles/spatial unit, cycles/sec., etc. For $I \times J$ local regions and each local region consisting of $M_1 \times M_2$ points, the function $X_{ij}(k_1, k_2)$ for $0 \leq k_1 \leq M_1-1, 0 \leq k_2 \leq M_2-1$ characterizes a frequency-domain representation for the ijth local region. $X_{ij}(k_1, k_2)$ is selected to have some predictable feature, such as decay. In fact, for a certain class of selected operations, including discrete cosine transform (DCT), discrete Fourier transform (DFT), lapped orthogonal transform (LOT) and subband signal analysis, $X_{ij}(k_1, k_2)$ typically decays very rapidly as $k_1$ and $k_2$ increase.

$X_{ij}(k_1, k_2)$ may be obtained by processing a local region portion of the video signal in a number of different ways. For example, $X_{ij}(k_1, k_2)$ may be determined by submitting the local video signal portion to DCT or DFT analysis. In these two cases, $X_{ij}(k_1, k_2)$ is typically obtained from non-overlapping local regions of $x(n_1, n_2)$. Another method of obtaining $X_{ij}(k_1, k_2)$ is to use the LOT operation. In this case $X_{ij}(k_1, k_2)$ is obtained from overlapping local blocks of $x(n_1, n_2)$.

Another method for obtaining $X_{ij}(k_1, k_2)$ is to use subband signal analysis. Specifically, let $s_{lm}(n_1, n_2)$ represent the subband-filtered signal corresponding to the (l,m)th band. Then $X_{ij}(k_1, k_2)$ can be obtained from $s_{lm}(n_1, n_2)$ by $$X_{ij}(k_1,k_2) = s_{lm}(n_1,n_2) \mid_{n_1 = i, \; n_2 = j, \; l = k_1, \; m = k_2}.$$

it is a key element of the invention that the features of $X_{ij}(k_1, k_2)$ allow it to be approximated with a repeatable, easily expressed function, and this approximation function can be used to generate an easily expressed modulation function $a_{ij}(k_1, k_2)$ which may be represented with just a few parameters. An example of such an approximation function is a class of exponential functions including $a_{ij}b_{ij}\sqrt{k_1^2+k_2^2}$ and $a_{ij}b_{ij}^{k_1}c_{ij}^{k_2}$. Now, for the purpose of determining the modulation function $a_{ij}(k_1, k_2)$, the absolute value $|X_{ij}(k_1, k_2)|$ of the frequency-domain function (shown in FIG. 4a) can be approximated with an approximation function such as shown in FIG. 4b. (For simplicity, the functions in FIG. 4 are shown for $k_2=0$.)

In one embodiment, $|X_{ij}(k_1, k_2)|$ is approximated according to:

$$|X_{ij}(k_1,k_2)| \approx a_{ij}b_{ij}\sqrt{k_1^2+k_2^2}. \quad (1)$$

Furthermore, the modulation function is preferably approximately inversely related to the approximation of $|X_{ij}(k_1, k_2)|$. Therefore, $a_{ij}(k_1, k_2)$ may be given by $$a_{ij}(k_1,k_2) \propto \frac{1}{|X_{ij}(k_1,k_2)|} \approx \frac{1}{a_{ij}b_{ij}\sqrt{k_1^2+k_2^2}}. \quad (2)$$

Therefore, as shown in FIG. 4(c) and based upon equations (1) and (2), $a_{ij}(k_1, k_2)$ in this case may be obtained from:

$$a_{ij}(k_1,k_2) = \beta_{ij}\gamma_{ij}\sqrt{k_1^2+k_2^2}. \quad (3)$$

It is convenient to choose the value of $\gamma_{ij}$ to be $$\frac{1}{b_{ij}}$$

due to computational simplicity. The value $a_{ij}$ may be chosen to be the maximum possible value that ensures that $X_{ij}(k_1, k_2)$ multiplied by $a_{ij}(k_1, k_2)$ remains within a specified allowed range for transmission. In FIG. 4(d), the modulation factor signal $a_{ij}(k_1, k_2)$ is multiplied to the signal $X_{ij}(k_1, k_2)$. In the figure, IMAX represents the maximum allowed value and IMIN represents the minimum allowed value. For large values of $a_{ij}b_{ij}\sqrt{k_1^2+k_2^2}$, the modulation factor $a_{ij}(k_1, k_2)$ will be relatively small, while for small approximating function values the modulation factor will be relatively large. This inverse relationship enables the modulated signal to utilize the available dynamic range more efficiently, thus increasing its robustness to channel degradation.

In the above example, there are a variety of different methods for obtaining $a_{ij}$ and $b_{ij}$ in equation (1). In one method, $a_{ij}$ is chosen to be $|X_{ij}(0,0)|$ and $b_{ij}$ is chosen by minimizing $$\sum_{k_1}\sum_{k_2}(X_{ij}(k_1,k_2) - X_{ij}(0,0) \cdot b_{ij}\sqrt{k_1^2+k_2^2})^2.$$

There are a number of different variations to the above method. For example, in the approximation of (1), $|X_{ij}(k_1,k_2)|$ may be neglected for some values of $k_1$ and $k_2$. If $|X_{ij}(k_1,k_2)|$ is zeroed out for some values of $k_1$ and $k_2$, which may be the case in transform coding, it is proper not to include those values in determining $a_{ij}$ and $b_{ij}$ in (1). It may also be desirable to neglect $X_{ij}(0,0)$ in the determination of $a_{ij}$ and $b_{ij}$ since $|X_{ij}(0,0)|$ is typically very large and is transmitted separately in some ATV systems.

The above analysis shows that $a_{ij}(k_1,k_2)$ may be totally specified by a few parameters such as $\beta_{ij}$ and $\gamma_{ij}$. If $M_1=8$ and $M_2=8$ and $a_{ij}(k_1,k_2)$ is specified with only $\beta_{ij}$ and $\gamma_{ij}$, then the modulation functions for $x(n_1,n_2)$ can be specified by $(1/32)N_1 \times N_2$ parameters.

A cooperating transmitter/receiver pair in practice of the present invention is shown and described in FIGS. 5, 6, and 7. In FIG. 5, video signal $x_{ij}(n_1,n_2)$ for the ijth local region is submitted to a transform or subband analysis section 22 of transmitter 20. The analyzer output $X_{ij}(k_1,k_2)$ is applied to modulation factor parameter computing section 24. The computed parameters associated with the modulation factor $a_{ij}(k_1,k_2)$, quantized at section 26, are transmitted as side information. An estimate of the modulation factor (for example, of $a_{ij}(k_1,k_2)$) is reconstructed from the quantized parameters (for example, $\hat{\beta}_{ij},\hat{\gamma}_{ij}$) in reconstructor 27, and the reconstructed estimate $\hat{a}_{ij}(k_1,k_2)$ is used to modulate $\hat{X}_{ij}(k_1,k_2)$ in modulator 28. The modulated signal $X_{ij}(k_1,k_2)$ is transmitted. (Quantization is used for digital transmission; however, analog transmission may be employed without quantization.)

In FIG. 6, receiver 30 receives the transmitted quantized modulation factor parameters and reconstructs $\hat{a}_{ij}(k_1,k_2)$ in block 31, and applies it to an inversion section 32 to generate $$\frac{1}{\hat{a}_{ij}(k_1,k_2)}.$$

The latter is applied to demodulator 34, where the modulation factor is used to demodulate the received transmission signal $\hat{x}_{ij}(k_1,k_2)$. The output of demodulator 34 is supplied to a transform or subband synthesizer unit 36 to generate $\hat{x}_{ij}(n_1,n_2)$, an approximation of video signal $x_{ij}(n_1,n_2)$.

The invention therefore benefits from the recognition that slowly-varying signals generally have a large amount of energy in the lower frequency regions, while fast-varying signals may have considerable energy in the high frequency regions. Signals such as the video luminance signal, for example, typically have more of the energy in the lower frequency regions. As a result, such signals have frequency-domain magnitudes which decay as the frequencies increase. This is a particularly useful characteristic since such signals may be represented with an approximating function having that characteristic.

The foregoing invention may be applied not only to AM/DM. In transform coding, for example, the side information technique can be used in allocating the number of bits to different transform coefficients. Specifically, the approximation function that approximates the transform-domain function can be used in bit allocation by allocating more bits to transform coefficients corresponding to a larger-amplitude portion of the approximation function. The transform coefficients corresponding to the larger-amplitude portion of the approximation function typically contains more information about the source signal. Therefore they typically require higher accuracy in representation, which can be achieved by allocating more bits.

FIG. 8 shows a frequency domain representation of a single frame. The frame (720×1280) is divided into 1,440 blocks. Each block is 8×8 in size, and thus has 64 coefficients. The transform coefficients making up the frame can be represented by the expression $X_{ij}(k_1,k_2)$, where i,j are the spatial variables (they denote the block), and $k_1,k_2$ are the frequency variables (they denote the frequency-domain coefficient within the block).

FIG. 9 shows the use of adaptive normalization in advance of adaptive modulation. Corresponding coefficients within different blocks are normalized across the entire frame. For each coefficient, e.g., $X_{i,j}(1,0)$, the maximum and minimum value of the coefficient across all blocks in the frame is determined. (Alternatively, the maximum and minimum could be determined across a plurality of frames, or across a portion of frame.) The determined maximum and minimum values are transmitted, unless they are known a priori at the receiver. Scale factors are then computed that will enlarge the maximum and minimum values to the full permissible range of the communication channel (or the storage medium). This is depicted diagrammatically in FIG. 10, where the minimum and maximum values are expanded to fill the full range of the communication channel. The same scale factors are applied to the same coefficient in every block in the frame. To allow the full range of the channel to be used, two scale factors can be used. There are a variety of different ways to use the full peak-to-peak ranges of the channel. One method is to use two scale factors to map linearly the computed maximum to the top peak and the computed minimum to the bottom peak. In addition to linear scaling, various nonlinear mappings can also be used.

An alternative to adaptive normalization is the use of preset normalization factors, which remain fixed from frame to frame, and are based on an expected maximum and minimum for a particular frequency coefficient over all frames. Different factors are used for different coefficients, but the factors remain fixed.

In the case of adaptive normalization, the scale factors must, of course, be transmitted as side information. In the case of preset normalization, it is possible to send the factors much less frequently, or not at all.

The next step is to adaptively modulate the normalized coefficients. All coefficients, with the possible exception of the DC coefficient $X_{0,0}$ (and perhaps a few very low frequency coefficients neighboring $X_{0,0}$) and coefficients not chosen to be transmitted, are adaptively modulated. Some coefficients may not be transmitted for various reasons such as their unimportance and the need to save channel bandwidth. Which coefficients are not transmitted are either known to the receiver or their identification information is transmitted as side information. Coefficients not transmitted are set to prespecified values (typically zero) known to the receiver.

In general, adaptive modulation is done by fitting a predetermined modulation function to the transform coefficients making up each block. There are three preferred approaches. One, which has been described earlier, is to fit a continuous function, e.g. an exponential (but as a general matter any function, e.g., a polynomial), to the entire block. This has the advantage of allowing continuous change of the modulation factor over the block, but it can require substantial computation time to compute the values that define the continuous function.

Another approach, is to break each block into regions (preferably all of the blocks are broken into the same regions), and then to choose a constant modulation factor for that region. The factor is chosen by finding the maximum value within the region, and computing the factor that will raise the maximum value to the full permissible range of the communication channel.

Preferred region layouts are shown in FIGS. 11A and 11B. In FIG. 11A, frequency space is divided into four regions. Region A is at low vertical and horizontal frequencies. Region B contains high horizontal and low vertical frequencies. Region C is symmetrical with region B, but contains high vertical and low horizontal frequencies. Region D contains high horizontal and high vertical frequencies.

A larger number of regions is shown in FIG. 11B. Seven regions are used, instead of four. Regions B and C of FIG. 11A have each been divided into two regions, one (B or D) having lower vertical (or horizontal) frequencies than the other (C or E). Region D of FIG. 11A has also been divided into middle and high frequency regions (F and G).

The third, and somewhat more complex implementation, is a combination of the first two. Frequency space is divided into regions, and a continuous function is separately fitted to each individual region.

All three approaches have the common thread of fitting a predetermined modulation function to the coefficients within a block. In the first case, the function is predetermined in that it is assumed that it will be, for example, an exponential function, and the fitting process consists of choosing the values that define the exponential function. In the second case, the function is predetermined in that it is decided ahead of time that the function will be a stepped surface with the steps laid out, for example, as shown in FIGS. 11A and 11B. The fitting process consists of choosing the amplitudes of the steps. In the third case, the modulation function is also a priori divided into regions, but with the further understanding that a predetermined function will be fitted within each region.

It may be preferable to use the same modulation factors in a limited number of neighborhood blocks. For example, as shown in FIG. 12, the same four constants A,B,C,D could be used in blocks $X_{0,0}$, $X_{0,1}$, $X_{1,0}$, and $X_{1,1}$. This has the advantage of reducing the number of values needed to be sent as side information to define modulation factors. In essence, what is being done in this alternative is to assign the same modulation factor to spatial neighbors (adjacent blocks) and frequency neighbors (nearby coefficients within the block). In the example shown in FIG. 12, the modulation function is a stepped surface, but the same concept of assigning the same factor to spatial neighbors can be applied to the other approaches (e.g., the same continuous function could be used for neighboring blocks). This concept is also useful in three dimensions (the third dimension being time), with the same modulation factors being used not only for spatial neighbors but also for temporal neighbors.

The size of the zone (4 blocks in FIG. 12) across which the modulation factors are kept the same could be varied adaptively. (Of course, a tradeoff has to be made as to the degree of adaptivity, as at some point the amount of side information necessary to convey to the receiver all of the adaptive factors becomes impractically large.)

In both normalization and adaptive modulation, some clipping of peak values is acceptable in order to allow larger normalization scale factors and larger adaptive modulation factors. Other embodiments are within the following claims.

What is claimed is:

1. A method of encoding an information signal, comprising the steps of:
   (1) dividing the information signal into a plurality of spatially-localized blocks;
   (2) forming a frequency-domain representation of each said block;
   (3) fitting a predetermined adaptive modulation function to each frequency-domain representation by selecting values for parameters defining the modulation function; and
   (4) adaptively modulating each frequency-domain representation using its modulation function.

2. A method of encoding a television signal, said signal consisting of a series of image frames having two spatial dimensions, comprising the steps of:
   (1) dividing said frames into a plurality of spatially-localized blocks, each block containing a plurality of pixels;
   (2) forming a frequency-domain representation of each said block, said representation having at least two spatial dimensions;
   (3) fitting a predetermined adaptive modulation function to each frequency domain representation, by selecting values for parameters defining the modulation function, said modulation function having at least two spatial dimensions; and
   (4) adaptively modulating each frequency-domain representation using its modulation function.

3. The method of claim 1 or 2 wherein said modulation function includes discontinuous regions and said selected values define the shape of the modulation function within those regions.

4. The method of claim 3 wherein said modulation function has a constant amplitude within at least some of said regions, and said selected values include the amplitudes within those regions.

5. The method of claim 4 wherein said frequency-domain representation has at least two spatial frequency dimensions, and said modulation function has four regions
   a first region smaller than the others and located adjacent the origin in frequency space,
   a second region extending from the origin along one of the spatial frequency axes, and containing low spatial frequencies in one dimension,
   a third narrow, elongated region extending from the origin along the other of the spatial frequency axes, and containing low spatial frequencies in the other dimension, and a fourth region containing the high spatial frequencies.

6. The method of claim 5 wherein said second and third regions are each divided along their long dimensions into two regions.

7. The method of claim 5 wherein said fourth region is divided into middle and highest frequency regions.

8. The method of claim 3 wherein said regions includes at least some regions in which the modulation function is a continuous function definable by a set of parameters, and said selected values include the values of those parameters.

9. The method of claim 1 or 2 wherein said modulation function includes at least one region in which the modulation function is a continuous function definable by a set of parameters, and said selected values include the values of those parameters.

10. The method of claim 9 wherein said modulation function is one continuous function definable by said selected values.

11. The method of claim 9 wherein said continuous function is an exponential function.

12. The method of claim 9 wherein said continuous function is a polynomial function.

13. The method of claim 9 wherein said continuous function decays in amplitude at higher frequencies.

14. The method of claim 2 wherein the same modulation function is used for a plurality of neighboring blocks within zones within said frame.

15. The method of claim 14 wherein the size of said zones is chosen adaptively.

16. The method of claim 1 or 2 combined with a method of decoding said encoded signal, said decoding method comprising the steps of
using said selected values to construct the inverse of the modulation function used in adaptive modulation;
using said inverse modulation function to demodulate the adaptively modulated frequency-domain representation.

17. The method of claim 1 or 2 further comprising the steps of transmitting/storing the adaptively modulated signal and the selected values representing the modulation function.

18. A method of encoding a television signal, said signal consisting of a series of image frames having two spatial dimensions, comprising the steps of:
(1) dividing said frames into a plurality of spatially-localized blocks, each block containing a plurality of pixels;
(2) forming a frequency-domain representation of each said block, said representation having at least two spatial dimensions and comprising a plurality of coefficients, each coefficient representing the value of the frequency-domain representation at a particular frequency for that block;
(3) normalizing the frequency-domain representation across a plurality of blocks prior to adaptive modulation, wherein the normalization is done on a coefficient by coefficient basis by scaling the amplitude of corresponding coefficients, one coefficient from each block, by the same scale factor, wherein the scale factors are chosen adaptively and vary from frame to frame, and wherein the scale factors for different coefficients generally have different values, and
(4) adaptively modulating the normalized frequency-domain representation.

19. The method of claim 2 wherein
the frequency-domain representation of each block has a plurality of coefficients, each coefficient representing the value of the frequency-domain representation at a particular frequency for that block, and
wherein the method further comprises the step of normalizing the frequency-domain representation across a plurality of blocks prior to adaptive modulation, and
wherein the normalization is done on an coefficient by coefficient basis by scaling the amplitude of corresponding coefficients in all of the plurality of blocks by the same scale factor, wherein the scale factors are chosen adaptively and vary from frame to frame.

20. The method of claim 18 or 19 wherein the method for choosing the scale factor for a given coefficient within a block comprises the steps of
(1) determining the range of variation of that coefficient over a plurality of blocks (e.g., determining the maximum and minimum of the coefficient over those blocks);
(2) based on the range of variation, determining a scale factor that will raise the amplitude of the coefficient with the highest amplitude without exceeding a permissible amplitude range.

21. The method of claim 20 wherein the normalization is done over at least one full frame, by determining the range of variation of individual coefficients over at least a full frame.

22. The method of claim 21 wherein at least some of said coefficients have positive and negative amplitudes.

23. A system for encoding an information signal comprising:
(1) means for dividing the information signal into a plurality of spatially-localized blocks;
(2) means for forming a frequency-domain representation of each said block;
(3) means for fitting a predetermined adaptive modulation function to each frequency-domain representation by selecting values for parameters defining the modulation function; and
(4) means for adaptively modulating each frequency-domain representation using its modulation function.

24. A system for encoding a television signal, said signal consisting of a series of image frames having two spatial dimensions, comprising:
(1) means for dividing said frames into a plurality of spatially-localized blocks, each block containing a plurality of pixels;
(2) means for forming a frequency-domain representation of each said block, said representation having at least two spatial dimensions;
(3) means for fitting a predetermined adaptive modulation function to each frequency domain representation, wherein said function fitting means selects values for parameters defining the modulation function, said modulation function having at least two spatial dimensions; and
(4) means for adaptively modulating each frequency-domain representation using its modulation function.

25. The system of claim 23 or 24 wherein said modulation function includes discontinuous regions and said selected values define the shape of the modulation function within those regions.

26. The system of claim 25 wherein said modulation function has a constant amplitude within at least some of said regions, and said selected values include the amplitudes within those regions.

27. The system of claim 26 wherein said frequency-domain representation has at least two spatial frequency dimensions, and said modulation function has four regions a first region smaller than the others and located adjacent the origin in frequency space, a second region extending from the origin along one of the spatial frequency axes, and containing low spatial frequencies in one dimension, a third narrow, elongated region extending from the origin along the other of the spatial frequency axes, and containing low spatial frequencies in the other dimension, and a fourth region containing the high spatial frequencies.

28. The system of claim 27 wherein said second and third regions are each divided along their long dimensions into two regions.

29. The system of claim 27 wherein said fourth region is divided into middle and highest frequency regions.

30. The system of claim 25 wherein said regions includes at least some regions in which the modulation function is a continuous function definable by a set of parameters, and said selected values include the values of those parameters.

31. The system of claim 23 or 24 wherein said modulation function includes at least one region in which the modulation function is a continuous function definable by a set of parameters, and said selected values include the values of those parameters.

32. The system of claim 31 wherein said modulation function is one continuous function definable by said selected values.

33. The system of claim 31 wherein said continuous function is an exponential function.

34. The system of claim 31 wherein said continuous function is a polynomial function.

35. The system of claim 31 wherein said continuous function decays in amplitude at higher frequencies.

36. The system of claim 24 wherein the same modulation function is used for a plurality of neighboring blocks within zones within said frame.

37. The system of claim 36 wherein the size of said zones is chosen adaptively.

38. The system of claim 23 or 24 combined with a signal decoder for decoding said encoded signal, said signal decoder comprising (1) means for using said selected values to construct the inverse of the modulation function used in adaptive modulation; and (2) means for using said inverse modulation function to demodulate the adaptively modulated frequency-domain representation.

39. The system of claim 23 or 24 further comprising means for transmitting/storing the adaptively modulated signal and the selected values representing the modulation function.

40. A system for encoding a television signal, said signal consisting of a series of image frames having two spatial dimensions, comprising:

(1) means for dividing said frames into a plurality of spatially-localized blocks, each block containing a plurality of pixels;

(2) means for forming a frequency-domain representation of each said block, said representation having at least two spatial dimensions and comprising a plurality of coefficients, each coefficient representing the value of the frequency-domain representation at a particular frequency for that block;

(3) means for normalizing the frequency-domain representation across a plurality of blocks prior to adaptive modulation, wherein the normalization is done on a coefficient by coefficient basis by scaling the amplitude of corresponding coefficients, one coefficient from each block, by the same scale factor, wherein the scale factors are chosen adaptively and vary from frame to frame; and wherein the scale factors for different coefficients generally have different values, and (4) adaptively modulating the normalized frequency-domain representation.

41. The system of claim 24 wherein the frequency-domain representation of each block has a plurality of coefficients, each coefficient representing the value of the frequency-domain representation at a particular frequency for that block, and wherein the system further comprises means for normalizing the frequency-domain representation across a plurality of blocks prior to adaptive modulation, and wherein the normalization is done on an coefficient by coefficient basis by scaling the amplitude of corresponding coefficients in all of the plurality of blocks by the same scale factor, and wherein the scale factors are chosen adaptively and vary from frame to frame.

42. The system of claim 40 or 41 wherein the means for choosing the scale factor for a given coefficient within a block comprises means for:

(1) means for determining the range of variation of that coefficient over a plurality of blocks (e.g., determining the maximum and minimum of the coefficient over those blocks);

(2) based on the range of variation, determining a scale factor that will raise the amplitude of the coefficient with the highest amplitude without exceeding a permissible amplitude range.

43. The system of claim 42 wherein the normalization is done over at least one full frame, by determining the range of variation of individual coefficients over at least a full frame.

44. The system of claim 43 wherein at least some of said coefficients have positive and negative amplitudes.

45. A method of decoding an encoded information signal, the encoded signal comprising, for each of a plurality of spatially-localized blocks, an adaptively-modulated, frequency-domain representation of the block, the method comprising the steps of:

adaptively demodulating the encoded signal by adaptively demodulating each frequency-domain block, using a predetermined demodulation function that is the inverse of a predetermined modulation function used in encoding the block, the predetermined demodulation function being defined by values of a plurality of parameters encoded with the encoded information signal;

performing an inverse frequency-domain transformation of each adaptively demodulated block to form an inverse transformed block; and combining the inverse transformed blocks to form the decoded information signal.

46. A method of decoding an encoded television signal, said signal representing a series of image frames having two spatial dimensions, said signal comprising, for each of a plurality of spatially-localized blocks within the image frames, an adaptively-modulated, frequency-domain representation of the block, the method comprising the steps of:

adaptively demodulating each image frame by adaptively demodulating each frequency-domain block, using a predetermined demodulation function that has at least two dimensions and that is the inverse of a predetermined modulation function used in encoding the block, the predetermined demodulation function being defined by values of a plurality of parameters encoded with the encoded image frames;

performing an inverse frequency-domain transformation of each adaptively demodulated block to form an inverse transformed block; and combining the inverse transformed blocks to form a decoded image frame.

47. The method of claim 45 or 46 wherein said demodulation function includes discontinuous regions and said values define the shape of the demodulation function within those regions.

48. The method of claim 47 wherein said demodulation function has a constant amplitude within at least some of said regions, and said values include the amplitudes within those regions.

49. The method of claim 48 wherein said frequency-domain representative has at least two spatial frequency dimensions, and said demodulation function has four regions, a first region smaller than the others and located adjacent the origin in frequency space, a second region extending from the origin along one of the spatial frequency axes, and containing low spatial frequencies in one dimension, a third narrow, elongated region extending from the origin along the other of the spatial frequency axes, and containing low spatial frequencies in the other dimension, and a fourth region containing the high spatial frequencies.

50. The method of claim 49 wherein said second and third regions are each divided along their long dimensions into two regions.

51. The method of claim 49 wherein said fourth region is divided into middle and highest frequency regions.

52. The method of claim 47 wherein said regions include at least some regions in which the demodulation function is a continuous function definable by a set of parameters, and said selected values include the values of those parameters.

53. The method of claim 45 or 46 wherein said demodulation function includes at least one region in which the demodulation function is a continuous function definable by a set of parameters, and said values include the values of those parameters.

54. The method of claim 53 wherein said demodulation function is one continuous function definable by said selected values.

55. The method of claim 53 wherein said continuous function is an exponential function.

56. The method of claim 53 wherein said continuous function is a polynomial function.

57. The method of claim 53 wherein said continuous function decays in amplitude at higher frequencies.

58. The method of claim 46 wherein the same demodulation function is used for a plurality of neighboring blocks within zones within said frame.

59. The method of claim 55 wherein the size of said zones is chosen adaptively.

60. The method of claim 45 or 46 wherein the encoded signal has been transmitted/stored.

61. A method of decoding a television signal, said signal representing a series of image frames having two spatial dimensions, said signal comprising, for each of a plurality of spatially-localized blocks within the image frames, an adaptively-modulated, normalized frequency-domain representation of the block, the method comprising the steps of:

adaptively demodulating each image frame by adaptively demodulating each frequency-domain block using a demodulation function to form demodulated blocks;

denormalizing the demodulated blocks to form denormalized blocks, by using the inverse of a normalizing process carried out when encoding the image frames, the normalizing process comprising normalizing the frequency domain representation across a plurality of blocks prior to adaptive modulation, wherein the normalization is done on a coefficient by coefficient basis by scaling the amplitude of corresponding coefficients, one coefficient from each block, by the same scale factor, wherein the scale factors are chosen adaptively and vary from frame to frame; and wherein the scale factors for different coefficients generally have different values, performing an inverse frequency domain representation on the denormalized blocks to form inverse transformed blocks; and combining the inverse transformed blocks to form a decoded image frame.

62. The method of claim 46 wherein the frequency-domain representation of each block has a plurality of coefficients, each coefficient representing the value of the frequency-domain representation at a particular frequency for that block, and wherein the method further comprises the step of denormalizing the frequency-domain representation across a plurality of blocks following adaptive demodulation, and wherein the denormalization is the inverse of normalization done on a coefficient by coefficient basis by scaling the amplitude of corresponding coefficients in all of the plurality of blocks by the same scale factor, wherein the scale factors are chosen adaptively and vary from frame to frame.

63. The method of claim 61 wherein the scale factors are predetermined for given coefficient locations, and remain the same from frame to frame.

64. The method of claim 62 wherein the scale factors are chosen adaptively and vary from frame to frame.

65. The method of claim 61 or 62 wherein the method for choosing the scale factor for a given coefficient within a block comprises the steps of (1) determining the range of variation of that coefficient over a plurality of blocks (e.g., determining the maximum and minimum of the coefficient over those blocks);

(2) based on the range of variation, determining a scale factor that will raise the amplitude of the coefficient with the highest amplitude without exceeding a permissible amplitude range.

66. The method of claim 65 wherein the normalization is done over at least one full frame, by determining the range of variation of individual coefficients over at least a full frame.

67. The method of claim 66 wherein at least some of said coefficients have positive and negative amplitudes.

* * * * *

UNITED STATES PATENT AND TRADEMARK OFFICE
CERTIFICATE OF CORRECTION

PATENT NO. : 5,422,675

DATED : June 6, 1995

INVENTOR(S) : Jae S. Lim

It is certified that error appears in the above-identified patent and that said Letters Patent is hereby corrected as shown below:

Col. 1, line 58, after "features", delete the comma and insert a period.

Col. 2, line 4, after "feature", delete the comma and insert a period.

Col. 2, line 6, after "signals", delete the comma and insert a period.

Col. 2, line 12, after "signals", delete the comma and insert a period.

Col. 8, line 17, "it" should be --It--.

Col. 8, line 47, equation (3), delete the comma at the beginning of the equation.

Col. 8, line 55, "$\alpha_{ij}$" should be --$\beta_{ij}$--.

Col. 8, line 55, before "may", insert a space.

Signed and Sealed this

Nineteenth Day of September, 1995

*Attest:*

BRUCE LEHMAN

*Attesting Officer*     *Commissioner of Patents and Trademarks*